United States Patent [19]

Molique

[11] 4,000,807

[45] Jan. 4, 1977

[54] VIBRATORY TROUGH PART FEEDER

[75] Inventor: Robert S. Molique, Dayton, Ohio

[73] Assignee: The Bendix Corporation, Southfield, Mich.

[22] Filed: May 21, 1975

[21] Appl. No.: 579,747

[52] U.S. Cl. ............................. 198/443; 198/757
[51] Int. Cl.$^2$ .................................... B65G 27/00
[58] Field of Search ............. 198/220 BC, 220 BA, 198/37, 256; 221/13

[56] References Cited

UNITED STATES PATENTS

| | | | |
|---|---|---|---|
| 3,651,985 | 3/1972 | Smith | 198/37 |
| 3,655,032 | 4/1972 | Willis | 198/220 BC |
| 3,835,983 | 9/1974 | Horii | 198/220 BA |

FOREIGN PATENTS OR APPLICATIONS 545,745  9/1957  Canada ..................... 198/220 BC

*Primary Examiner*—John J. Love
*Assistant Examiner*—Douglas D. Watts
*Attorney, Agent, or Firm*—John R. Benefiel

[57] ABSTRACT

A general purpose part feeder is disclosed based on a modified conventional bowl feeder, the modifications including the lining of the bowl spiral trough with a fiber material which upon induced vibratory motion causes advancement of the parts in a particular direction dependent on the orientation of the material with respect to the trough and also including an intermittent mode of operation. The fiber material is disposed in the trough in segments oriented such that the part velocity varies in different sections of the trough so that the parts are separated in the last trough section proximate the feeder outlet. Parts are fed out of the bowl feeder singly by means of a photodetector-timer relay control which causes the bowl feeder to be operated in intervals so as to advance a part to the exit point whereat the photodetector detects its presence and causes the bowl to be shut off. Upon receiving a signal for a part to be advanced out of the feeder, a timer relay is energized causing the bowl feeder to be activated for an interval long enough for the part at the photocell to be advanced out of the machine, so that the bowl feeder will continue to be activated until the next part is advanced to block the photocell to cause the bowl feeder to again be shut off.

6 Claims, 3 Drawing Figures

U.S. Patent   Jan. 4, 1977   4,000,807
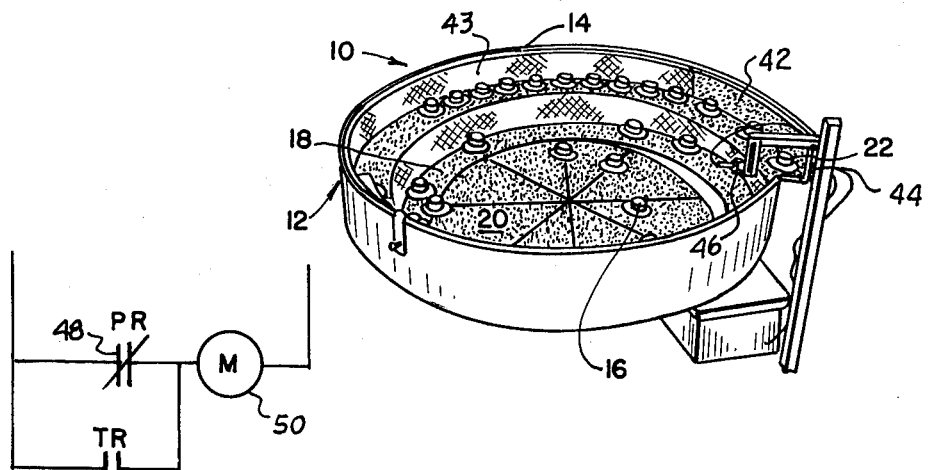
FIG. 1
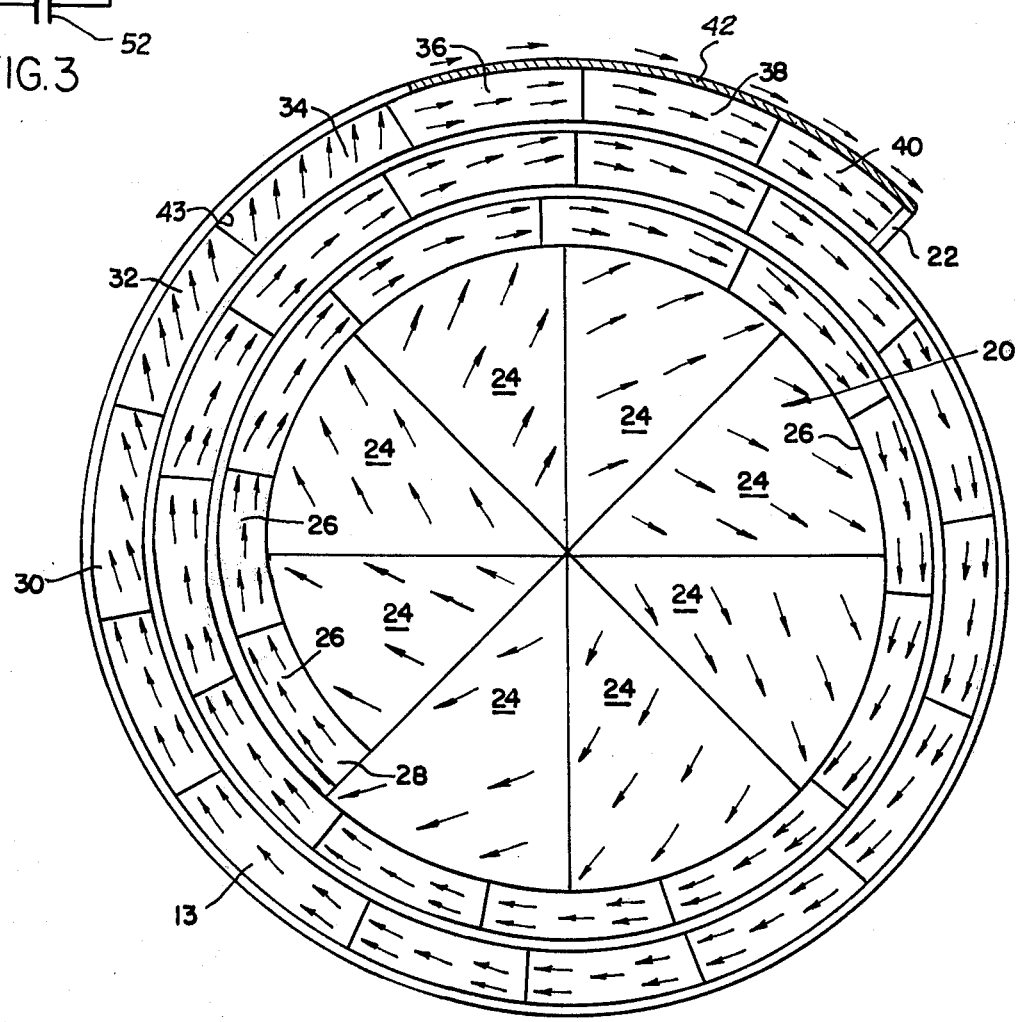
FIG. 3
FIG. 2

VIBRATORY TROUGH PART FEEDER

BACKGROUND OF THE INVENTION

1. Field of the Invention

This invention concerns part feeders and more particularly vibratory part feeders of the type known as bowl feeders.

2. Description of the Prior Art

Vibratory part feeders such as bowl feeders have been quite successful for feeding small parts from bulk into assembly machines, automatic machine tools, etc. In these machines a bowl having a spiral trough leading upwardly from the center of the bowl is vibrated which causes parts to advance upwardly along this trough and be fed one at a time out of the device. Two problems exist in such conventional devices. One, the parts are not necessarily spaced as they pass out of the device such that reliable one-at-a-time feeding by simply turning the device on and off is not possible. Secondly, the vibratory movements tend to be quite noisy because of movement against the bowl structure, and if dampening material is added to the bowl structure, this tends to interfere with the part advance movement.

This latter problem is aggravated by the continuous mode of operation of most of these devices, that is the parts to be fed are recycled into the bowl in order to control the movement of parts out of the feeder.

Accordingly, it is an object of the present invention to provide a vibratory feeder which is capable of one-at-a-time part feeding by means of a simple on-off control.

It is another object of the present invention to provide an arrangement for quieting the operation of vibratory feeders which does not affect the feeding performance of the device.

SUMMARY OF THE INVENTION

These and other objects which will become apparent upon a reading of the following specification and claims are accomplished by a modified conventional bowl feeder, the modifications including the lining of the bowl spiral trough with a fiber material which upon induced vibratory motion causes advancement of the parts in a particular direction dependent on the orientation of the material with respect to the trough and also including an intermittent mode of operation. The fiber material is disposed in the trough in segments oriented such that the part velocity varies in different sections of the trough so that the parts are separated in the last trough section proximate the feeder outlet. Parts are fed out of the bowl feeder singly by means of a photodetector-timer relay control which causes the bowl feeder to be operated in intervals so as to advance a part to the exit point whereat the photodetector detects its presence and causes the bowl to be shut off. Upon receiving a signal for a part to be advanced out of the feeder, a timer relay is energized causing the bowl feeder to be activated for an interval long enough for the part at the photocell to be advanced out of the machine, so that the bowl feeder will continue to be activated until the next part is advanced to block the photocell to cause the bowl feeder to again be shut off.

DESCRIPTION OF THE DRAWINGS

FIG. 1 is a perspective view of a vibratory feeder according to the present invention.

FIG. 2 is a plan view in diagrammatic form of the feeder shown in FIG. 1.

FIG. 3 is a schematic representation of the control circuit for the vibratory feeder according to the present invention.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the Drawings, the vibratory feeder 10 according to the present invention includes a conventional bowl feeder 12, the details of which are well known to those in the art and accordingly are not here described. Suffice it to say, these devices include a bowl 14 adapted to hold the parts 16 to be fed and also includes a trough 18 adapted to guide parts 14 from the central location 20 whereat the parts 16 are initially disposed to the outlet point 22 whereat they are fed out of the device. In a bowl type vibratory feeder the trough 18 takes the form of a spiral leading upwardly and outwardly as shown in FIG. 1.

The motive power for induced movement of the parts 16 is a means for vibrating the entire structure (not shown) which causes these parts to advance from the central location 20 to the outlet point 22.

According to the present invention, this movement is enhanced, controlled, and quieted by lining the trough 18 with an "inclined fiber" material currently sold under the Trademark DYNA-SLIDE. This material consists of a backing from which protrude stiff fibers all inclined in the same direction. Reciprocation of the material with an object resting on its surface creates a movement in the same direction in which the fibers are inclined. Details of the construction of this material is disclosed in U.S. Pat. Nos. 3,841,471 and 3,789,711. Thus, the material provides a means for inducing movement of the parts 16 in a specific direction.

This material is utilized according to the present invention to line the bottom of the spiral trough 18 and the central location 20 to induce movement of the parts 16 without metal-to-metal contact between the parts 16 and the trough 18.

Referring to FIG. 2, it can be seen that this material is disposed therein in segments with its orientation selected to enhance and control the movement of the parts. In this view, the arrows represent the direction in which the fibers are inclined in each segment.

As can be seen by reference to this view, the segments 24 in the central location are wedge-shaped with the fibers inclined both in outward and circumferential (clockwise) directions to cause the parts to move outwardly and about the periphery 26 of the central location 20 so that they are guided into the inlet point 28 of the spiral trough 18.

Within the trough 18 in a first region therein are disposed segments 26 in which the fibers are inclined directly along the direction of the trough so that the parts 16 are advanced at the maximum velocity.

In a second region of the spiral trough 18, approaching the outlet point 22, the three segments 30, 32 and 34 have the fibers increasingly directed at the outer trough wall so that the velocity of the parts 16 along the trough 18 is decreased, causing the parts 16 to bunch as shown in FIG. 1.

In the third region following said second region and proximate the outlet 22, the inclined fiber material is disposed in the trough 18 in three segments 36, 38 and 40 which have the fibers thereof again oriented in line with respect to the trough 18 for maximum velocity, and in addition the side wall 42 is covered with additional fiber material to further increase the rate of movement of the parts 16 and enhance the difference in the rate of movement of said parts 16 in this region.

The net effect is to reliably produce separation as shown in FIG. 1, since the parts 16 moved into the last three segments 36, 38 and 40 move away from the preceding, still more slowly moving parts 16.

This reliable separation allows control of the feeding by an on-off control of the vibratory motor as described below, which alleviates the noise problems referred to above, particularly for multiple bowl installations.

In order to further reduce the noise level, the trough side walls other than at the outlet point 22 are covered with carpeting or other sound deadening material 43.

At the outlet 22 means for detecting the presence of a part 16 is provided, which takes the form of a photodetector 44 positioned opposite a light source 46 so that as a part 16 comes to the outlet 22 the light is blocked. This controls a photo-relay 48 (FIG. 3) so that the vibratory motor 50 is deenergized.

Upon receiving a system control signal calling for feeding of a part, a timer-relay is activated which causes operation of the vibratory motor for an interval sufficient for the lead part 16 at the outlet point 22 to move out of the vibratory feeder 12, and unblock the photodetector 44. This interval could be adjusted for various part sizes.

After the timer-relay 52 times out, the vibrator motor 50 continues to operate until another part 16 moves into the outlet point 22 again blocking the photodetector 44 and deenergizing the vibratory motor 50, until another control signal is received from the system control.

It can thus be seen that the objects of the present invention have been accomplished by this invention in that the reliable part separation at the outlet produced by the particular arrangement of the fiber material allows simple control over the part feeding by controlling the vibratory motor, and also that reliable part advance can be obtained even though the vibrations are dampened by the inclined fiber material and the carpeting on the side walls.

The intermittent nature of operation increases the tolerable level of noise produced by the feeder and may eliminate the need for covers or shielding.

Also, since in an application in which many bowl feeders are to be used, the noise level produced by the assemblage is considerably reduced by virtue of the intermittent operation of the individual feeders, only one or two are operated at a time, rather than all being in continuous operation.

What is claimed is:

1. In a vibratory bowl feeder of the type having a bowl and a spiral trough extending about the periphery of said bowl receiving parts contained in said bowl at a central location and feeding the same to an outlet point, the improvement comprising:

an inclined fiber material disposed along the bottom of said spiral trough with said inclined fiber material oriented with said fibers inclined in the direction of said spiral trough for at least a portion of said spiral trough and wherein said inclined fiber material disposed in said spiral trough includes a segment in a portion of said trough approaching said outlet wherein said segment fibers are inclined towards a wall of said spiral trough to thereby reduce the rate of movement of said parts on said segment, and wherein said inclined fiber material disposed in said spiral trough in a region following said segment and proximate said outlet is disposed with said fibers inclined along the direction of said spiral trough, whereby said parts are separated proximate said outlet by the resulting differing rates of movement of said parts.

2. The bowl feeder according to claim 1 wherein said inclined fiber material is disposed in a central location within said bowl with said fibers inclined in outward and circumferential directions to direct said parts into said spiral trough.

3. The bowl feeder of claim 1 further including inclined fiber material disposed on the outer side wall of said spiral trough in said region proximate said outlet to further enhance the difference in said rate of movement of said parts.

4. The bowl feeder of claim 1 further including means for detecting a part at said outlet part, means for discontinuing operation of said bowl feeder upon detection of a part at said outlet, and timer means causing said bowl feeder to be operated notwithstanding said part being detected at said outlet for an interval sufficient for said part to be moved out of said feeder.

5. A vibratory feeder for feeding parts including a trough having at least one side wall, means for advancing said parts into said trough and along the path of said trough including means for inducing movement in a specific direction within said trough, said means inducing movement of said parts in a first region along the direction of the trough, and in a second region following said first region said means induces movement of said parts at least partially in an outward direction from said trough, and in a third region following said second region said means induces movement of said parts along said trough, said means inducing movement of said parts in said trough including an inclined fiber material disposed in said trough and inducing movement of said parts in the direction in which said fibers are inclined, whereby said parts are separated upon passing through said regions due to the relative rate of movement of said parts in said respective regions.

6. A vibratory feeder for feeding parts including a trough having at least one side wall, means for advancing said parts into said trough and along the path of said trough including means for inducing movement in a specific direction within said trough, said means inducing movement of said parts in a first region along the direction of the trough, and in a second region following said first region, said means induces movement of said parts at least partially in an outward direction from said trough, and in a third region following said second region, said means induces movement of said parts along said trough further including means for detecting the presence of a part at a point in said third region, means for discontinuing operation of said feeder upon detection of a part at said point, and timer means causing said feeder means to be operated notwithstanding said part being detected at said outlet for an interval sufficient for said part to move out of said feeder, whereby said parts are separated upon passing through said regions due to the relative rate of movement of said parts in said respective regions.

* * * * *